United States Patent Office 3,121,017
Patented Feb. 11, 1964

3,121,017
BLUE-TONED COMPOSITIONS
Gregor Berstein, Newton Center, and Webster H. Opie, Jr., Lynn, Mass., assignors to Cabot Corporation, Boston, Mass., a corporation of Delaware
No Drawing. Filed June 28, 1961, Ser. No. 120,161
10 Claims. (Cl. 106—253)

This invention relates to the production of blue compositions and in particular to blue or blue-toned protective and/or decorative compositions comprising a vehicle, a colored pigment component such as carbon black, and titanium and/or zirconium dioxide.

Heretofore, blue colored or bluish-toned protective coating compositions, plastics, elastomers and the like have generally been produced by dispersing suitable blue pigments in a resinous or plastic vehicle. Thus, a blue protective coating composition, for example, may comprise a vehicle such as linseed oil having dispersed therein opacity grade (0.2 to 0.4 micron particle diameter) titanium dioxide and a blue colorant. Similarly, a grayish-blue or bluish-gray protective coating composition may comprise a vehicle, and a pigment blend comprising opacity grade titanium dioxide, a gray or black pigment such as carbon black, and a blue colorant. Protective coating compositions comprising a vehicle, opacity grade titanium dioxide, and carbon black are gray in color.

In accordance with the present invention, however, it has been discovered that blue or blue-toned compositions can be obtained simply by dispersing in a vehicle a colored pigment such as carbon black or red iron oxide, and finer than opacity grade titanium and/or zirconium dioxide.

Accordingly, it is a principal object of the present invention to provide novel blue or blue-toned compositions.

It is another object of this invention to produce blue or blue-toned compositions (without using a blue colorant).

Other objects will in part be obvious and will in part appear hereinafter.

In accordance with the present invention, it was discovered that blue or blue-toned compositions can be produced by dispersing substantially homogeneously into a vehicle such as linseed oil or polyethylene, between about 0.02 and 25% by volume of the total resinous or plastic vehicle of a colored pigment (other than a blue colored pigment), such as red iron oxide or phthalocyanine green, but preferably carbon black, and between about 0.02 and 25% by volume of the total resinous or plastic vehicle of extra fine titanium dioxide and/or zirconium dioxide, which has an average ultimate particle diameter below about 100 millimicrons, and preferably below about 50 millimicrons. Moreover, it was discovered that in the practice of the present invention, the ratio of fine particle size titanium and/or zirconium dioxide to said colored pigment should be in the range of between about 0.1 to 1 and 35 to 1. This discovery is remarkable and completely unexpected since the extremely fine particle diameter titanium and/or zirconium dioxides are themselves generally white in color and usually form only transparent dispersions, and there was accordingly no reason to believe that the combination of a colored pigment and said extra fine dioxides would produce any color other than that of the colored pigment.

In general, all colored pigments (other than blue colored pigments) such as red iron oxide, toluidene red, phthalocyanine green, and other organic or inorganic color pigments, or toners and mixtures thereof are suitable for the purposes of the present invention. Carbon blacks of all types, i.e. thermal blacks, acetylene blacks, gas and oil furnace blacks and blacks produced by impingement of a flame on a cool surface, are in general suitable for the purposes of the present invention and are generally preferred.

There is no critical limitation to the total quantity of the extra fine titanium and/or zirconium dioxides and colored pigment that can be utilized in a given composition in accordance with this invention. We have found that the smaller the particle size of the fine dioxides utilized, and/or the better said fine dioxides and said colored pigment are dispersed in the vehicle, the smaller is the total quantity of these materials required to achieve a given level of blue coloring. At any rate, it is recommended that the total quantity of said colored pigment and said fine dioxides in protective coating compositions or in plastic compositions fall in the range of between about 0.04 and 50% by volume of the total resinous or plastic vehicle.

The method by which the extremely fine titanium and/or zirconium dioxide is produced is not critical. Titanium or zirconium dioxides having an average particle size of less than 100 millimicrons are currently produced by flame hydrolysis of volatile titanium or zirconium halides, such as $TiCl_4$ and $ZrCl_4$. Suitable processes for this and other reactions have been disclosed, for example, by Gosta Flemmert in "Studies on Inorganic Fillers," published in 1953 by Dalarnes Tidnings-och Boktrychkeri-AB in Hedemora, Sweden.

Also, predominantly titanium dioxide or zirconium dioxide produced by other processes such as by precipitation from aqueous media, for example, from an aqueous solution of ilmenite, would be suitable for the purposes of the present invention, provided it were equally fine in particle size.

The present invention is particularly applicable to the production of bluish, oil-base and/or oil-containing paint formulations. Typical oil-base and oil-containing paint formulations include alkyd resin base paints, oil modified latex paints and paints containing treated oils.

In addition to the colored pigment and the extra fine titanium or zirconium dioxides, the protective coating formulations of the present invention may include any other ingredients normally utilized in paint formulations, for example, other pigments and extenders such as lead and zinc pigments, clay, and calcium carbonate, siliceous extenders such as wollastonite, silicas and talc, drying oils such as linseed oil, soy-bean oil, dehydrated castor oil, fish oil, tung oil, and treated drying and semi-drying oils, solvents such as mineral spirits and petroleum solvents in general, driers such as lead, cobalt and manganese, and fungicides such as phenyl mercury oleate.

In particular the use of moderate quantities of light colored pigments such as wollastonite or opacity grade titanium or zirconium dioxides i.e. having an average particle diameter between about 200 and about 400 millimicrons, is often desirable in protective coating compositions, for example, in order to increase the reflectivity thereof. However, in our invention, opacity grade titanium and/or zirconium dioxide should not be utilized in amounts in excess of 30% by volume of the total drying oil or resinous vehicle.

Vehicles other than oil based, oleoresinous based, and synthetic resin containing paint formulations suitable for the purposes of the present invention are: polyethylene, polystyrene, polyvinyl chloride, natural and synthetic rubber and other plastics and elastomers. Obviously, the finished compositions comprising these vehicles may also include such other ingredients such as are normally utilized in that particular type of composition. For example, polyethylene compositions can include in addition to the pigments of the present invention, other pigments, plasticisers, extenders, antioxidants and the like.

There follow a number of non-limiting illustrative examples:

Example 1

0.5 gram of "Titanox RA–50," a titanium dioxide pigment produced by Titanium Pigments Corporation, of New York, and having an average particle diameter between about 300 and 400 millimicrons, and 0.01 gram of channel carbon black having an average particle diameter of about 22 millimicrons were dispersed by means of a "Hoover" muller in 0.45 cc. of acid refined linseed oil. The final composition was a neutral gray in color.

Example 2

This example was essentially a duplicate of Example 1 except that 0.5 gram of pyrogenically produced fine particle size titanium dioxide having an average particle diameter of about 30 millimicrons was utilized instead of 0.5 gram of "Titanox RA–50." The final composition was a bluish-gray color.

Example 3

To a pebble mill half-filled with ceramic balls, there was added 100 grams of "Geon 121," a polyvinyl chloride resin produced by B. F. Goodrich Corp., 44 grams of didecyl-adipate (a plasticiser), 22 grams of didecylphthalate (another plasticiser), 3 grams of "Ferro 1212A" a cadmium-barium organic stabilizer produced by Ferro Chemical Co., of Bedford, Ohio, 1.5 grams of "Mapico Red #516," a synthetic red iron oxide produced by C. K. Williams Corp., of Easton, Pa., and 0.5 gram of "Ti-Pure R–500," a rutile titanium dioxide produced by E. I. du Pont de Nemours, Inc., having an average particle diameter between about 200 and 400 millimicrons. This formulation was milled for about 16 hours after which the resulting plastisol was cured at 325° F. for about 20 minutes. The resulting cured composition had a total reflectivity of about 8.5, an amber reflectivity of about 13.5 and a blue reflectivity of about 2.5% as measured through the tristimulus filters (green, amber and blue) of a photoelectric reflection meter, using magnesium oxide as the reference standard.

Example 4

This example was essentially a duplicate of Example 3 except that (a) 1.0 gram of "Mapico Red #516" was utilized in this example instead of 1.5 grams as in Example 3, and (b) 1.0 gram of fine particle size titanium dioxide having an average particle diameter of about 30 millimicrons was utilized in this example instead of the 0.5 gram of "Ti-Pure R–500," utilized in Example 3. The resulting cured composition had a total and amber reflectivity substantially equal to that of the cured composition of Example 3. The blue reflectivity of the composition of this example, however, was 3.25%.

Obviously many changes can be made in the above description and examples without departing from the scope of the present invention. For example, although only polyethylene and polyvinyl chloride were mentioned above as a suitable plastic vehicle, other plastics such as polypropylene, polybutene, polystyrene and the like are suitable vehicles for the purposes of the present invention. Accordingly, it is intended that the disclosure of specific materials be regarded as illustrative and as in no way limiting the scope of the invention.

What we claim is:

1. A blue colored composition consisting essentially of an organic vehicle having substantially homogeneously dispersed therein a pigment formulation consisting essentially of between about 0.02 and 25% by volume of said vehicle of a colored pigment other than a blue colored pigment, between about 0.02 and 25% by volume of said vehicle of a substance chosen from the group consisting of titanium and zirconium dioxides having an average particle diameter of less than 100 millimicrons, and mixtures thereof, the ratio of said substance to said colored pigment being in the range between about 0.1 to 1 and 35 to 1 by volume, and less than about 30% by volume of said vehicle of a light colored pigment selected from the group consisting of wollastonite, opacity grade titanium and zirconium dioxides and mixtures of said dioxides having an average particle diameter above about 200 millimicrons.

2. The composition of claim 1 wherein said colored pigment is chosen from the group consisting of carbon black, red iron oxide, phthalocyanine green, and toluidene red.

3. The composition of claim 1 wherein said substance has an average particle diameter of less than 50 millimicrons.

4. The composition of claim 1 wherein said colored pigment is carbon black.

5. The composition of claim 1 wherein said substance is titanium dioxide having an average particle diameter of less than about 50 millimicrons.

6. The composition of claim 1 wherein said substance is a zirconium dioxide having an average particle diameter of less than about 50 milimicrons.

7. The composition of claim 1 wherein said light colored pigment is titanium dioxide having an average particle diameter between about 200 and about 400 millimicrons.

8. The composition of claim 1 wherein said light colored pigment is zirconium dioxide having an average particle diameter of between about 200 millimicrons and 400 millimicrons.

9. The composition of claim 1 wherein said colored pigment is a red colored pigment.

10. The composition of claim 1 wherein said colored pigment is a green colored pigment.

References Cited in the file of this patent

UNITED STATES PATENTS

| | | |
|---|---|---|
| 2,212,917 | Horning | Aug. 27, 1940 |
| 2,403,248 | Todd et al. | July 2, 1946 |
| 2,819,176 | Vartanian | Jan. 7, 1958 |